(12) United States Patent
Takama

(10) Patent No.: US 9,373,172 B2
(45) Date of Patent: Jun. 21, 2016

(54) OPHTHALMIC-IMAGE PROCESSING APPARATUS AND METHOD THEREFOR

(75) Inventor: Yasufumi Takama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 551 days.

(21) Appl. No.: 13/214,561

(22) Filed: Aug. 22, 2011

(65) Prior Publication Data

US 2012/0051611 A1 Mar. 1, 2012

(30) Foreign Application Priority Data

Aug. 27, 2010 (JP) ................................. 2010-191215

(51) Int. Cl.
*G06K 9/00* (2006.01)
*G06T 7/00* (2006.01)
*G06T 15/08* (2011.01)

(52) U.S. Cl.
CPC .............. *G06T 7/0083* (2013.01); *G06T 15/08* (2013.01); *G06T 2207/10101* (2013.01); *G06T 2207/30041* (2013.01)

(58) Field of Classification Search
CPC .............................. G06T 7/0083; G06T 15/08
USPC ................................................. 382/131, 128
See application file for complete search history.

(56) References Cited

U.S. PATENT DOCUMENTS

| | | | |
|---|---|---|---|
| 7,992,999 B2* | 8/2011 | Xu et al. | 351/206 |
| 8,189,002 B1* | 5/2012 | Westerhoff et al. | 345/426 |
| 8,442,286 B2* | 5/2013 | Imamura et al. | 382/128 |
| 2007/0115481 A1* | 5/2007 | Toth et al. | 356/511 |
| 2008/0317308 A1 | 12/2008 | Wu | |
| 2009/0190092 A1 | 7/2009 | Tsukada | |
| 2009/0268159 A1 | 10/2009 | Xu | |
| 2010/0202677 A1 | 8/2010 | Imamura | |
| 2011/0034803 A1* | 2/2011 | Stetson | 600/425 |
| 2011/0137157 A1 | 6/2011 | Imamura | |
| 2011/0211057 A1* | 9/2011 | Iwase et al. | 348/78 |
| 2012/0070059 A1* | 3/2012 | Furukawa et al. | 382/131 |
| 2013/0181976 A1* | 7/2013 | Dastmalchi et al. | 345/419 |

FOREIGN PATENT DOCUMENTS

| | | |
|---|---|---|
| CN | 101049229 A | 10/2007 |
| CN | 101084824 A | 12/2007 |
| EP | 1972265 A2 | 9/2008 |
| EP | 2189110 A1 | 5/2010 |
| JP | 2001-170056 A | 6/2001 |
| JP | 2005-046394 A | 2/2005 |
| JP | 2007-175271 A | 7/2007 |
| JP | 2010-000191 A | 1/2010 |
| JP | 2010-110656 A | 5/2010 |
| JP | 2010-142498 A | 7/2010 |
| WO | 2010-044184 A1 | 4/2010 |
| WO | 2010-071091 A1 | 6/2010 |
| WO | 2010/140477 A | 12/2010 |
| WO | 2010-140477 A1 | 12/2010 |

* cited by examiner

*Primary Examiner* — Samir Ahmed
(74) *Attorney, Agent, or Firm* — Canon USA, Inc. IP Division

(57) ABSTRACT

The present invention provides an ophthalmic-image processing apparatus including a layer-specifying unit configured to specify at least one layer from an image generated based on volume data of a subject's eye, and a display-control unit configured to display a projected image on a display unit, where the projected image is achieved by projecting volume data of the specified layer.

11 Claims, 4 Drawing Sheets

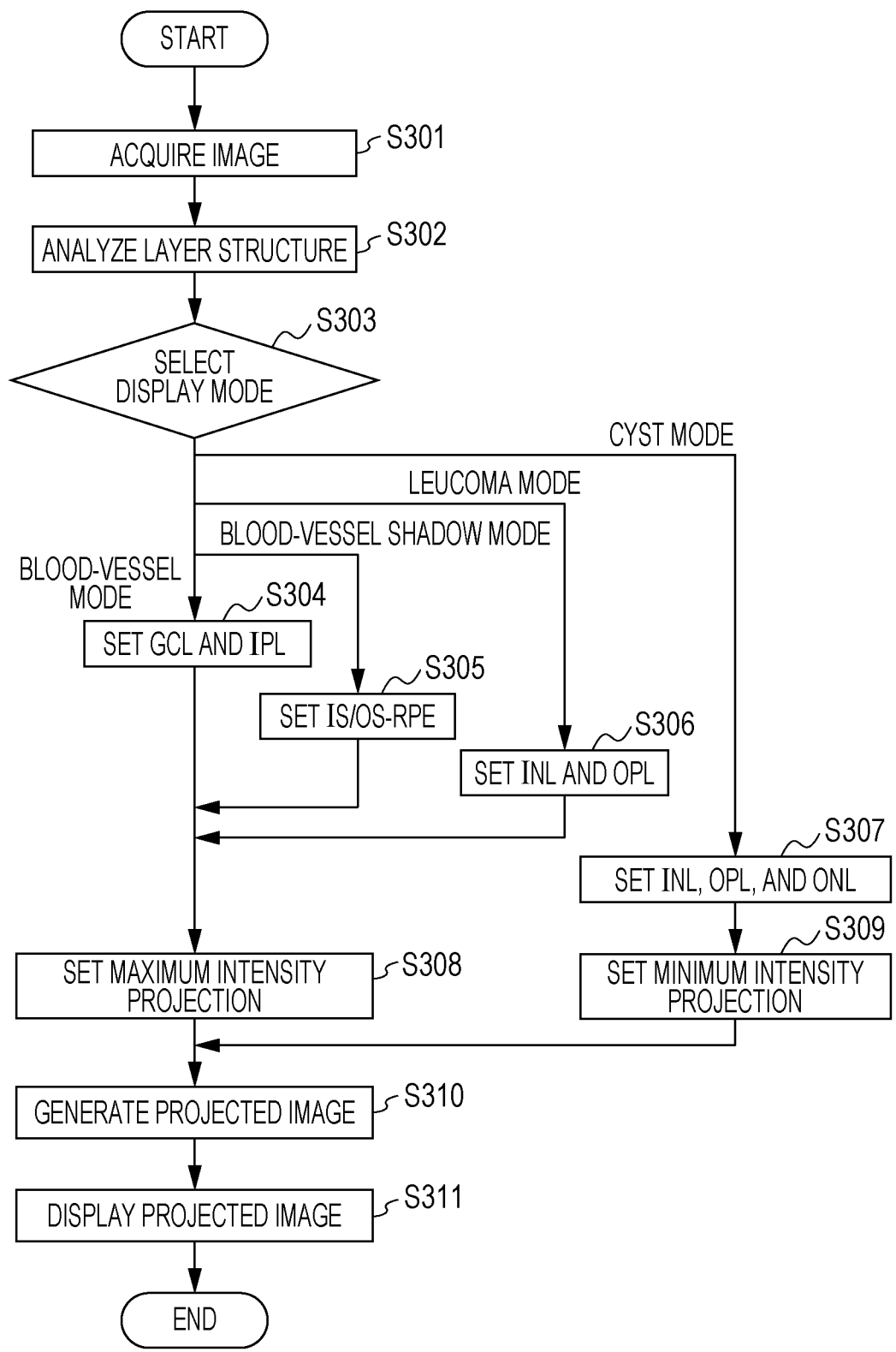

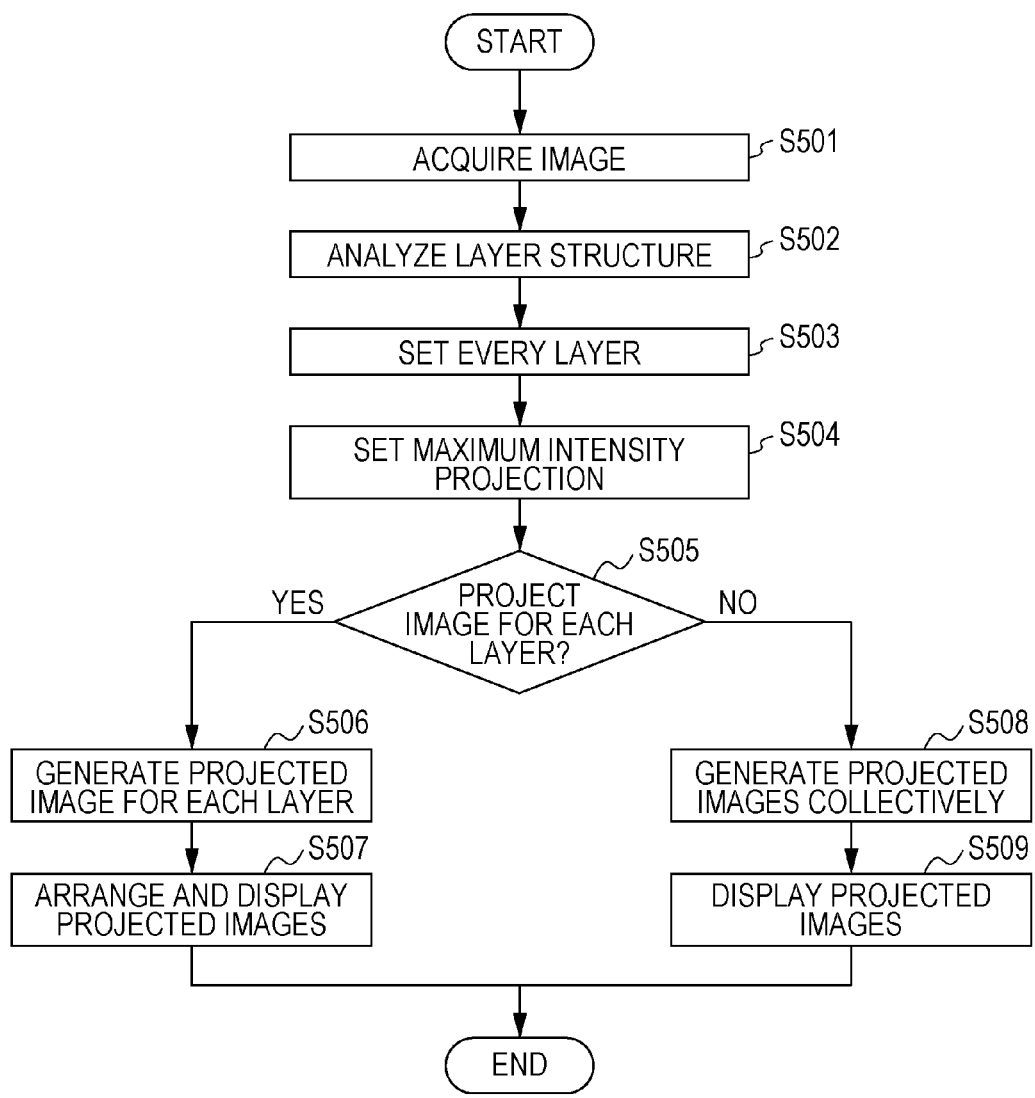

OPHTHALMIC-IMAGE PROCESSING APPARATUS AND METHOD THEREFOR

BACKGROUND OF THE INVENTION

1. Field of the Invention

The present invention relates to an ophthalmic-image processing apparatus used for an ophthalmic examination, etc., and a method therefor.

2. Description of the Related Art

An apparatus achieved by using optical coherence tomography (hereinafter referred to as OCT) can acquire a two-dimensional tomographic image of the fundus. At the medical scene of ophthalmology, a user can observe the fundus-layer structure, the state or distribution of lesions, the three-dimensional running pattern of fundus blood vessels, and so forth based on images (a plurality of two-dimensional tomographic images) that are achieved based on the fundus-volume data.

Japanese Patent Laid-Open No. 2010-000191 discloses the technology to perform rendering processing for the volume data when the images that are achieved based on the fundus-volume data are displayed. The rendering processing includes volume rendering, a maximum intensity projection, and so forth. At that time, image data of a pseudo three-dimensional image of a subject viewed from a specified gaze direction can be displayed on a display device.

SUMMARY OF THE INVENTION

Incidentally, a blood vessel, a leucoma, and so forth that are found on the image achieved based on the fundus-volume data are high-brightness regions. Further, a nerve fiber layer, a retinal pigment epithelium, and so forth that are found on the image achieved based on the fundus-volume data are also high-brightness regions.

Therefore, when image processing is merely performed for the fundus-volume data through the maximum intensity projection or the like to make it easier for a user to observe the blood vessel, the leucoma, and so forth, the high-brightness regions including the nerve fiber layer, the retina pigment epithelium, etc. are also displayed. Consequently, the user has difficulty in observing the blood vessel, the leucoma, etc., which reveals that the above-described technology is not useful to make a medical diagnosis.

The present invention provides an ophthalmic-image processing apparatus including a layer-specifying unit configured to specify at least one layer from an image generated based on volume data of a subject's eye, and a display-control unit configured to display a projected image on a display unit, where the projected image is achieved by projecting volume data of the specified layer through a specified projection. The present invention allows for automatically specifying a projection layer and a projection based on a display mode or a display object (a blood vessel, a leucoma, etc.) selected by a user. The present invention further allows for specifying a projection layer based on a project specified by the user. Consequently, a projected image of volume data of the specified projection layer, which is projected through the specified projection, can be displayed on a display device so that the display object can be observed with facility.

Further features of the present invention will become apparent from the following description of exemplary embodiments with reference to the attached drawings.

BRIEF DESCRIPTION OF THE DRAWINGS

FIG. 2 is a flowchart illustrating exemplary processing procedures of the ophthalmic-image processing apparatus according to the first embodiment.

FIG. 3 is a flowchart illustrating exemplary processing procedures of an ophthalmic-image processing apparatus according to a second embodiment of the present invention.

DESCRIPTION OF THE EMBODIMENTS

An embodiment of the present invention allows for automatically specifying a projection layer and a projection based on a display mode or a display object (a blood vessel, a leucoma, etc. of the fundus of a subject's eye) selected by the user. The embodiment further allows for specifying a projection layer based on a projection specified by the user. Consequently, a projected image of volume data of the specified projection layer, which is projected through the specified projection, can be displayed on a display device so that the display object can be easily observed.

Hereinafter, embodiments of the present invention will be described with reference to the attached drawings. It should be noted that an ophthalmic-image processing apparatus according to an embodiment of the present invention will be described below, and the present invention is not limited thereto.

First Embodiment

Figure 1A:
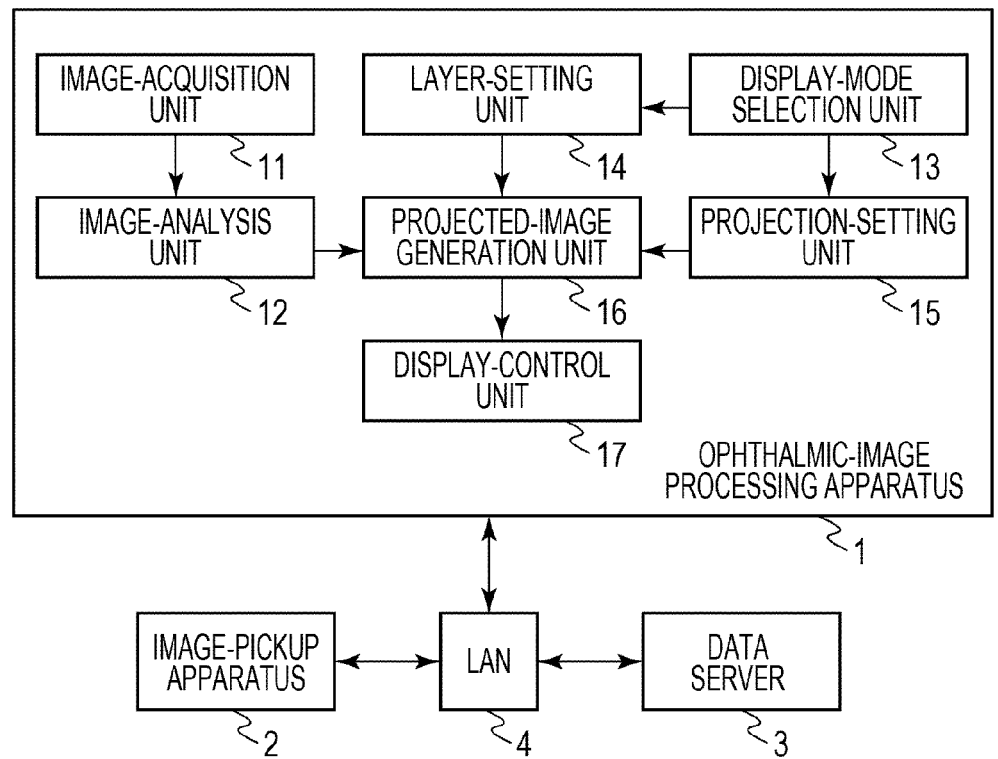
FIG. 1A illustrates an exemplary configuration of an ophthalmic-image processing apparatus according to a first embodiment of the present invention.

An ophthalmic-image processing apparatus 1 according to a first embodiment of the present invention is provided as the following method. Namely, when a user selects a display mode (or display objects) from among a group of display modes (or a group of display objects), the above-described method allows for automatically specifying a projection layer and a projection that are appropriate to easily observe the display objects and acquiring a projected image. The ophthalmic-image processing apparatus 1 of the first embodiment will be described with reference to FIG. 1A. For reference sake, FIG. 1A illustrates an exemplary configuration of the ophthalmic-image processing apparatus 1 and an exemplary system configuration of apparatuses that are connected to the ophthalmic-image processing apparatus 1.

The ophthalmic-image processing apparatus 1 is connected to an image-pickup apparatus 2 configured to pick up a tomographic image of the fundus, such as OCT, and a data server 3 via a local area network (LAN) 4 including an Ethernet cable or the like. The OCT can acquire volume data of the retina of the fundus by acquiring at least two tomographic images. The image-pickup apparatus 2 outputs an image generated based on the volume data of a subject (patient) to the ophthalmic-image processing apparatus 1 in response to operations that are performed with the user (an operator or doctor). Further, the ophthalmic-image processing apparatus 1 may be configured to be connected to the data server 3 storing the volume data acquired with the image-pickup apparatus 2 and acquire an image generated based on appropriate volume data selected from among the stored volume data. The ophthalmic-image processing apparatus 1 may be connected to the above-described apparatuses via an interface including a USB cable, an IEEE 1394 cable, etc. Further, the ophthalmic-image processing apparatus 1 may be connected to the above-described apparatuses via an external network such as the Internet through the use of the LAN 4.

Next, processing procedures that are performed with the ophthalmic-image processing apparatus 1 of the first embodiment will be described with reference to a flowchart of FIG. 2. First, an image-acquisition unit 11 acquires volume-image data picked up with the image-pickup apparatus 2 and volume-image data accumulated in the data server 3, and outputs the acquired volume-image data to an image-analysis unit 12 at step S301.

Figure 1B:
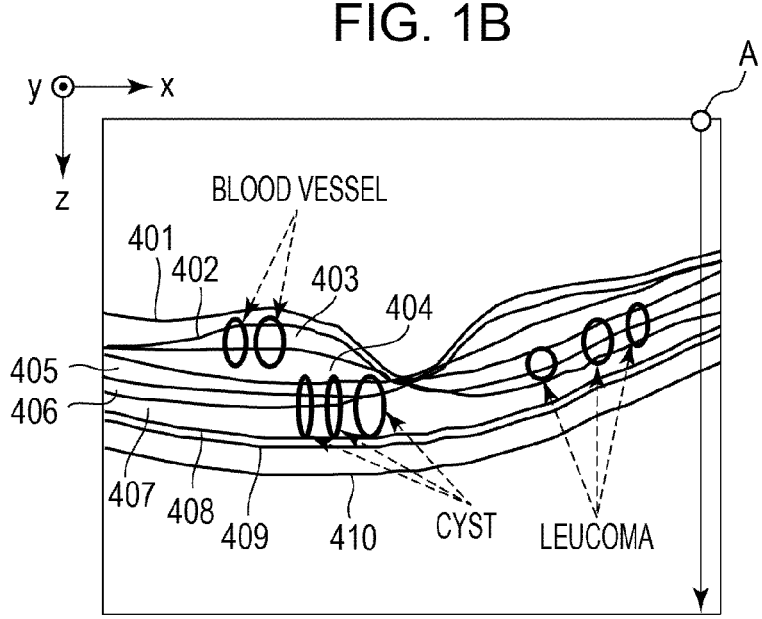
FIG. 1B schematically illustrates an exemplary layer structure of a retina.

Next, the image-analysis unit 12 extracts data of layers that are included in retinal layers from the volume-image data at step S302. The above-described layer extraction will be described with reference to FIG. 1B. FIG. 1B illustrates layers 401, 402, 403, 404, 405, 406, 407, 408, 409, and 410 that are included in the retinal layers, and a single pixel column A (A-scan) parallel to the z-axis direction. The layer 401 indicates an internal limiting membrane (ILM), the layer 402 indicates a nerve fiber layer (NFL), the layer 403 indicates a ganglion cell layer (GCL), the layer 404 indicates an inner plexiform layer (IPL), the layer 405 indicates an inner nuclear layer (INL), the layer 406 indicates an outer plexiform layer (OPL), the layer 407 indicates an outer nuclear layer (ONL), the layer 408 indicates an external limiting membrane (ELM), the layer 409 indicates a photoreceptor inner/outer segment junction (IS/OS), and the layer 410 indicates a retinal pigment epithelium (RPE).

Further, the boundary between the layers is expressed as "upper layer/lower layer", for example. In the first embodiment, the image-analysis unit 12 at least extracts the ILM 401, the NFL 402/GCL 403, the IPL 404/INL 405, the OPL 406/ONL 407, the IS/OS 409, and the RPE 410. Here, the image-analysis unit 12 extracting layers is synonymous with the image-analysis unit 12 extracting the boundary between layers. For example, the NFL 402 is extracted by extracting the ILM 401 corresponding to the boundary between a vitreous body and a retina, and the boundary between the NFL 402 and the GCL 403.

For extracting the retinal layers, first, images are generated by applying a median filter and a Sobel filter to a tomographic image (hereinafter referred to as a median image and a Sobel image). Next, a profile is generated for every A-scan based on the converted median image and Sobel image. A brightness-value profile is generated for the median image and a slope profile is generated for the Sobel image. Then, the peaks of the profile generated based on the Sobel image are detected. The retinal layers are extracted by referring to the profile of the median image, which corresponds to the front and the rear of the detected peak, or the gap between the detected peaks. Input volume-image data and information about the extracted retinal layers are output to a projected-image generation unit 16.

Further, a display-mode selection unit 13 (which is also referred to as a display-object selection unit) outputs data of a display mode (or a display object) selected with the user to a layer-setting unit 14 (also referred to as a layer-specifying unit) and a projection-setting unit 15 (also referred to as a projection-specifying unit) at step S303. The layer-setting unit 14 sets a projection layer (or the gap between layers for projection) based on the display mode. Further, the projection-setting unit 15 sets a projection provided to project at least part of the volume data of a subject's eye based on the display mode. Then, data of the set projection layer and projection is output to the projected-image generation unit 16. Further, the gap between layers for projection and the projection may be automatically selected based on a display object selected with the display-object selection unit.

In the first embodiment, the projection set with the projection-setting unit 15 is a maximum intensity projection or a minimum intensity projection. The maximum intensity projection and the minimum intensity projection allow for displaying image data of a pseudo three-dimensional image of the subject viewed from a specified gaze direction on a display device. The maximum intensity projection is effective to observe a high-brightness region (a region having at least a specified brightness value) including a blood vessel, a leucoma, etc. Further, the minimum intensity projection is effective to observe a low-brightness region (a region having a brightness value less than the specified brightness value) including a cyst or the like. The user can select a blood-vessel mode, a blood-vessel shadow mode, a leucoma mode, and a cyst mode as the display mode. Hereinafter, processing procedures that are performed in response to each of the selections will be specifically described.

First, when the blood-vessel mode is selected, the layer-setting unit 14 sets the GCL and the IPL as the projection layers at step S304, because the running pattern of the blood vessels is clearly shown in the GCL and the IPL. Since the brightness of a blood-vessel region shown on a tomographic image is high, the projection-setting unit 15 sets the maximum intensity projection at step S308. In accordance with the setting, the voxels of a region extending from the NFL/GCL to the IPL/INL are maximum-intensity projected, which enables the user to observe the three-dimensional running pattern of blood vessels of a retina.

Further, when the blood-vessel shadow mode is selected, the layer-setting unit 14 sets a layer existing between the IS/OS and the RPE as a projection layer at step S305. Further, the projection-setting unit 15 sets the maximum intensity projection to increase the contrast between a blood-vessel shadow region and other regions that are shown on a projected image at step S308. In accordance with the setting, the voxels of a region extending from the IS/OS to the RPE are maximum-intensity projected so that a blood-vessel shadow-projected image allowing the user to easily observe a blood-vessel shadow can be generated.

Further, when the leucoma mode is selected, the layer-setting unit 14 sets the INL and the OPL as projection layers at step S306 based on experience that many leucomas occur in the INL and the OPL. Further, the projection-setting unit 15 sets the maximum intensity projection at step S308, because the brightness of a leucoma is high. Regions other than high-brightness regions including the NFL or the RPE are maximum-intensity projected so that a projected image can be generated, where the projected image allows the user to easily observe a high-brightness lesion such as a leucoma which is more inside than the above-described layers.

Still further, when the cyst mode is selected, the layer-setting unit 14 sets the INL, the OPL, and the ONL as projection layers at step S307 based on experience that many cysts occur in the INL, the OPL, and the ONL. Further, the projection-setting unit 15 sets the minimum intensity projection at step S309, because a cyst is a low-brightness region. In accordance with those settings, the voxels of a region extending from the IPL/INL to the IS/OS are minimum-intensity projected so that a projected image allowing the user to easily observe a low-brightness lesion such as a cyst can be generated.

Still further, the projected-image generating unit 16 generates a projected image of the volume-image data based on the set projection layer and projection, and outputs data of the generated projected image to a display-control unit 17 at step S310. Then, the display-control unit 17 displays the generated projected image on a display device (not shown) such as a display at step S311. The above-described configuration allows for automatically setting a projection layer and a projection that are appropriate to generate a projected image allowing the user to easily observe a display object when the user makes the display-mode selection.

Still further, even though the projection layer and the projection are automatically set in the first embodiment, the setting may be made manually at the user's discretion. The above-described configuration can be achieved by providing the check buttons corresponding to extracted layers, selecting a layer as a projection target, the layer corresponding to one of the check buttons when the check button is in the on state, and excluding the layer from the projection-target selection when the check button is in the off state. By manually setting a layer for projection, the user can specify a layer including a lesion.

Second Embodiment

In a second embodiment of the present invention, the method of generating a projected image for every layer, and arranging and displaying the layers to observe lesions or blood vessels spreading in the retinal layers at one time is described. Processing procedures that are performed with an ophthalmic-image processing apparatus according to the second embodiment will be described with reference to a flowchart of FIG. 3. Since steps S501 and S502 are equivalent to steps S301 and S302, the descriptions thereof will be omitted. In the second embodiment, every extracted layer is set as a projection layer at step S503. Further, the maximum intensity projection is set as a projection at step S504.

First, at step S505, the user determines whether a projected image is generated for every set layer or all of set layers that are handled as a single unit. When the projected image is generated for the single unit, procedures of steps S508 and S509 become equivalent to the individual procedures of steps S310 and S311 of the first embodiment. Further, when the user determines to generate the projected image for every set layer at step S505, the projected-image generation unit 16 generates the projected image for every set layer at step S506.

In the second embodiment, a maximum intensity-projected image is generated for each of layers including the NFL, the IPL, the INL, the OPL, the ONL, and from the IS/OS to the RPE. Data of each of the generated projected images is output to the display-control unit 17. Then, the display-control unit 17 arranges the generated projected images into a 2×3-matrix form and displays the arranged images on a display device (not shown) at step S507. Consequently, the user can display the lesions or the blood vessels spreading in the retinal layers on the same image screen of the display device.

Third Embodiment

Figure 4:
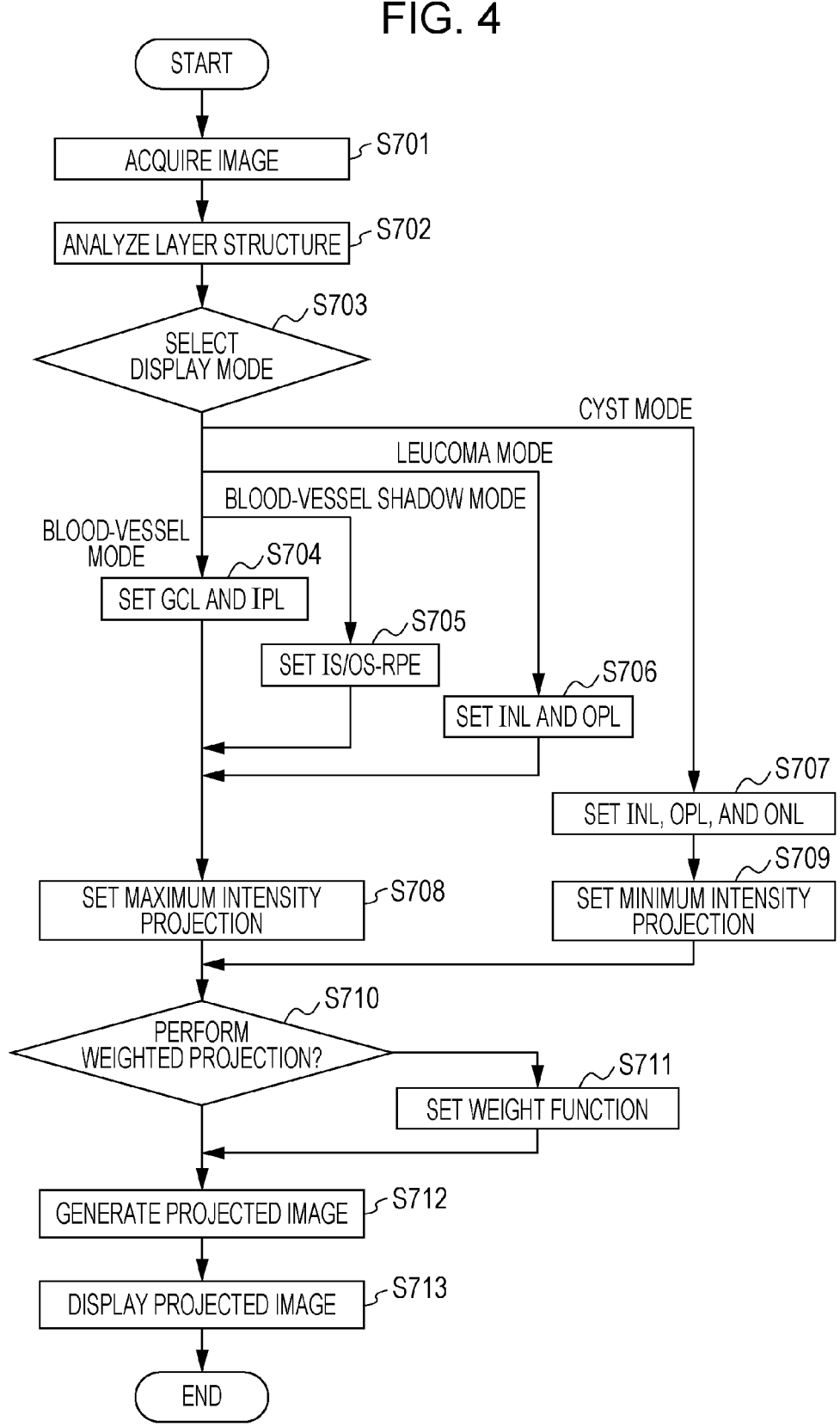
FIG. 4 is a flowchart illustrating exemplary processing procedures of an ophthalmic-image processing apparatus according to a third embodiment of the present invention.

In a third embodiment of the present invention, an example where the user selects a weighted projection for performing the weight assignment based on a specified brightness value to observe a three-dimensional distribution of display objects existing in a set brightness region is considered. At that time, a weight function is set based on the specified brightness value, and a projected image is generated based on the set weight function. Processing procedures that are performed with an ophthalmic-image processing apparatus according to the third embodiment will be described with reference to a flowchart of FIG. 4. Since steps S701 to S709 are equivalent to steps S301 to S309, the descriptions thereof will be omitted. Further, the processing of step S713 is equivalent to that of step S311. In the third embodiment, the leucoma mode is selected as the display mode.

First, when the user determines to perform the weighted projection at step S710, the projected-image generation unit 16 sets a weight function at step S711. For example, when a high-brightness leucoma is displayed, the weight-function value of the brightness-value range corresponding to higher-order n % of the frequency of the retinal-layer histogram is set to 1, and those of other ranges are set to 0.

Further, the projected-image generation unit 16 generates a projected image by projecting the maximum value of values that are obtained by multiplying the brightness values of voxels that are provided on the line of gaze by the weight, and outputs data of the generated projected image to the display-control unit 17 at step S712. The above-described configuration allows the user to assign weights to the brightness values of the voxels, and generate a projected image by projecting the maximum value or the minimum value of the values that are obtained by multiplying the brightness values by the weights. Consequently, the user can observe the three-dimensional distribution of display objects existing in a set brightness region.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191215 filed Aug. 27, 2010, which is hereby incorporated by reference herein in its entirety.

What is claimed is:

1. An image processing apparatus comprising:
at least one processor that operates to:
select a display object from a plurality of display objects;
automatically select, from a plurality of retinal layers, at least one retinal layer corresponding to the selected display object;
automatically select, from a plurality of projections, a projection corresponding to the selected display object; and
display, on a display unit, a projected image achieved by projecting the selected at least one retinal layer in volume-image data of a retina of a subject's eye by using the selected projection.

2. The image processing apparatus according to claim 1, wherein the at least one processor further operates to select, from the plurality of retinal layers, at least one retinal layer other than a nerve fiber layer and a retinal pigment epithelium, and
wherein the at least one processor further operates to select, from the plurality of projections, a projection provided to project data including brightness values having at least a specified value among the selected at least one retinal layer.

3. The image processing apparatus according to claim 1,
wherein the at least one processor further operates to select, from the plurality of retinal layers, at least one retinal layer other than a nerve fiber layer and a retinal pigment epithelium, and
wherein the at least one processor further operates to select a maximum intensity projection from the plurality of projections.

4. The image processing apparatus according to claim 1,
wherein the at least one processor further operates to select, from the plurality of retinal layers, a plurality of retinal layers corresponding to the selected display object, and
wherein the at least one processor further operates to arrange and display, on the display unit, a plurality of projected images achieved by projecting the plurality of selected retinal layers by using the selected projection.

5. An image processing method comprising the steps of:
selecting a display object from a plurality of display objects;
automatically selecting, from a plurality of retinal layers, at least one retinal layer corresponding to the selected display object;
automatically selecting, from a plurality of projections, a projection corresponding to the selected display object; and
displaying, on a display unit, a projected image achieved by projecting the selected at least one retinal layer in volume-image data of a retina of a subject's eye by using the selected projection.

6. The image processing method according to claim 5,
wherein, in the step of selecting the at least one retinal layer, at least one retinal layer other than a nerve fiber layer and a retinal pigment epithelium is selected from the plurality of retinal layers, and
wherein, in the step of selecting the projection, a projection provided to project data including brightness values having at least a specified value among the selected at least one retinal layer is selected from the plurality of projections.

7. The image processing method according to claim 5,
wherein, in the step of selecting the at least one retinal layer, at least one retinal layer other than a nerve fiber layer and a retinal pigment epithelium is selected from the plurality of retinal layers, and
wherein, in the step of selecting the projection, a maximum intensity projection is selected from the plurality of projections.

8. The image processing method according to claim 5,
wherein, in the step of selecting the at least one retinal layer, a plurality of retinal layers corresponding to the selected display object is selected from the plurality of retinal layers, and
wherein, in the displaying step, a plurality of projected images achieved by projecting the plurality of selected retinal layers by using the selected projection is arranged and displayed on the display unit.

9. A non-transitory recording medium recording a program making a computer execute the ophthalmic-image processing method according to claim 5.

10. The image processing apparatus according to claim 1, wherein the at least one processor further operates to acquire the volume-image data including a plurality of tomographic images acquired by an image-pickup apparatus picking up the retina of the subject's eye, the image-pickup apparatus being connected to the image processing apparatus so as to enable communication therebetween.

11. The image processing method according to claim 5, further comprising acquiring the volume-image data including a plurality of tomographic images acquired by an image-pickup apparatus picking up the retina of the subject's eye is acquired, the image-pickup apparatus being connected to an image processing apparatus used in the image processing method so as to enable communication therebetween.

* * * * *